US008205630B2

(12) United States Patent
McKee

(10) Patent No.: US 8,205,630 B2
(45) Date of Patent: Jun. 26, 2012

(54) LOW PRESSURE RELIEF VALVE AND METHOD OF MANUFACTURING SAME

(75) Inventor: Joseph R. McKee, Ventura, CA (US)

(73) Assignee: Ausco, Inc., Port Washington, NY (US)

( * ) Notice: Subject to any disclaimer, the term of this patent is extended or adjusted under 35 U.S.C. 154(b) by 993 days.

(21) Appl. No.: 12/136,499

(22) Filed: Jun. 10, 2008

(65) Prior Publication Data

US 2009/0301584 A1 Dec. 10, 2009

(51) Int. Cl.
*F16K 43/00* (2006.01)
(52) U.S. Cl. .................. 137/15.18; 137/315.41; 137/541
(58) Field of Classification Search ............. 137/315.01, 137/15.18, 315.41, 315.42, 327, 537, 541, 137/542; 411/304; 29/432
See application file for complete search history.

(56) References Cited

U.S. PATENT DOCUMENTS

| | | | | |
|---|---|---|---|---|
| 1,971,514 A | * | 8/1934 | Stone | 166/124 |
| 2,080,760 A | * | 5/1937 | Condon | 137/524 |
| 2,177,779 A | | 10/1939 | McDonald | |
| 3,297,071 A | * | 1/1967 | Neuschotz et al. | 411/259 |
| 3,422,840 A | | 1/1969 | Bryant et al. | |
| 3,918,482 A | | 11/1975 | Stroh | |
| 4,049,017 A | | 9/1977 | Jones | |
| 4,644,023 A | | 2/1987 | Gray | |
| 5,074,326 A | | 12/1991 | Baker et al. | |
| 5,358,212 A | | 10/1994 | Soltys et al. | |
| 5,934,327 A | * | 8/1999 | Nelson et al. | 137/883 |
| 6,050,295 A | * | 4/2000 | Meisinger et al. | 137/541 |
| 6,250,329 B1 | | 6/2001 | Rashidi | |
| 6,367,501 B2 | * | 4/2002 | Svehaug | 137/517 |
| 2004/0129054 A1 | | 7/2004 | Hyme | |

OTHER PUBLICATIONS

International Search Report dated Jul. 28, 2009 for International Application No. PCT/US2009/046888.

* cited by examiner

*Primary Examiner* — John Fristoe, Jr.
*Assistant Examiner* — Macade Brown
(74) *Attorney, Agent, or Firm* — F. Chau Associates, LLC

(57) ABSTRACT

A method for assembling and adjusting a pressure setting of a valve includes positioning a threaded spider and a poppet spring on a poppet, mounting a valve body into an assembly fixture, inserting the poppet including the threaded spider and the poppet spring positioned thereon into the mounted valve body, pushing an adjusting fork through the assembly fixture and through the valve body, engaging the threaded spider with the adjusting fork, and flowing pressurized fluid into the assembly fixture while simultaneously rotating the adjusting fork in a direction to draw the threaded spider into the valve body and to compress the poppet spring.

14 Claims, 17 Drawing Sheets

LOW PRESSURE RELIEF VALVE AND METHOD OF MANUFACTURING SAME

BACKGROUND OF THE INVENTION

1. Technical Field

The present disclosure relates to improvements in the design of a low pressure relief valve and methods of manufacturing, assembling and calibrating same.

2. Discussion of the Related Art

Known low pressure relief valves relieve pressures of, for example, below 500 psi in gas and/or liquid systems. Referring to FIG. 1, a known type of low pressure relief valve 10, such as the 500 series relief valve manufactured by Circle Seal Controls, Inc., has a compact design, and includes a mushroom type poppet 11, with an O-ring seal 12, spring 13, guide spider 14, and adjusting nut 15 under the head of the poppet 11.

However, in order to assemble the valve 10 and set the pressure, the components thereof must be assembled into the valve body 16 and then the adjusting nut 15 must be screwed onto the threaded poppet shaft. This nut 15 must then be spun up and down on the poppet shaft to adjust the set pressure. This assembly and pressure adjustment process is tedious and time consuming.

The valve 10 employs the mushroom style poppet 11 with the O-ring seal 12 that is dropped into the discharge end of the valve body 16. To contain fluid at pressures below set pressure, the O-ring 12 mates when the valve is closed, with a tapered sealing area 17 on the body 16. This tapered sealing area 17 serves as a guide for the poppet 11, but only when the valve 10 is closed.

Into the other end of the valve body, a spring 13, and a guide spider 14 is assembled and screwed onto the threaded poppet shaft. This guide spider 14 is threaded and is rotated relative to the poppet 11 in order to vary the spring force, which establishes the set pressure of the valve 10. Lastly, the adjusting nut 15 is screwed onto the poppet 11 to lock the guide spider 14 to the poppet 11.

Once assembled, the valve 10 is placed in a test fixture and fluid (liquid or gas) is introduced at a prescribed flow rate, and the pressure is observed. With this configuration, the relief pressure cannot be adjusted while fluid flow is being applied to the valve 10, because an adjusting wrench to turn the adjusting nut 15 will disturb the force balance between the piston area of the poppet and the poppet spring 13. To adjust the relief pressure setting of the valve 10, the poppet 11 must be held firmly against the seat to prevent rotating the poppet 11, while the guide spider 14 is rotated. Fluid flow is again introduced into the valve 10 to see how close the pressure is to the design requirement. This process is then repeated as many times as necessary until the desired set pressure is achieved. The locking nut 15 needs to be tightened against the guiding spider 14 without disturbing or moving the set pressure out of tolerance. Usually, the technique involves setting the set pressure of the valve 10 slightly low to accommodate any upward shift in set pressure due to tightening the nut 15. As stated above, this assembly and pressure adjustment process is tedious and time consuming.

In addition, if the valve 10 is not periodically operated, the rubber O-ring 12 has shown a propensity to attach itself to the seat and cause a high (and out of tolerance) first crack. Also, once the fluid begins to flow through the valve 10, the poppet 11 has no means of being guided and can fall over to one side. This causes inaccurate flow and uneven wear on the O-ring 12.

Therefore, a need exists for a better functioning relief valve that is more efficient and economical to manufacture, assemble, and calibrate.

SUMMARY OF THE INVENTION

A valve, in accordance with an embodiment of the present invention, comprises a valve body, a poppet positioned in the valve body, wherein the poppet comprises a shaft, a poppet spring positioned on the shaft, a threaded spider positioned on the shaft between the poppet spring and a head of the poppet, and a guide spider positioned on the shaft between the poppet spring and a leading end of the poppet. The leading end of the poppet may be flared to retain the above components.

The valve body may include threads positioned on an inner surface of the valve body, and the threaded spider may include threads positioned on an outer surface of the threaded spider that engage the threads of the valve body.

The threaded spider may compress the poppet spring, and the leading end of the poppet may be flared to retain the threaded spider, spring, and guide spider.

The poppet may include a seal comprising polytetrafluoroethylene (PTFE) positioned adjacent and in contact with the head of the poppet.

A device for assembling and setting a cracking pressure of a valve, in accordance with an embodiment of the present invention, comprises a chamber, an opening for receiving and mounting a valve body in the chamber, wherein the valve body receives a poppet comprising a shaft, a poppet spring positioned on the shaft, and a threaded spider positioned on the shaft between the poppet spring and a head of the poppet, an adjusting fork positioned in the chamber, and moveable through the valve body to engage the threaded spider, and draw the threaded spider into the valve body by rotating the adjusting fork.

The threaded spider may compress the poppet spring. The chamber may comprise an opening for receiving pressurized fluid into the chamber and the adjusting fork may be rotated while the pressurized fluid flows into the chamber.

The threaded spider may include a plurality of legs protruding from the threaded spider, and the adjusting fork may include a plurality of slots for respectively receiving the plurality of legs.

The valve body may include threads positioned on an inner surface of the valve body, and the threaded spider may include threads positioned on an outer surface of the threaded spider that engage the threads of the valve body.

The adjusting fork may include a thread upsetter positioned thereon that distorts the threads of the valve body when the adjusting fork is moved out of the valve body.

A plurality of locking buttons may be positioned between the threads of the threaded spider and the threads of the valve body, the locking buttons being deformed due to pressure exerted on the threads of the threaded spider and the threads of the valve body.

The poppet may further comprise a guide spider positioned on the shaft between the poppet spring and a leading end of the poppet. The guide spider may include a plurality of legs protruding from the guide spider, and the adjusting fork may include a plurality of slots for respectively receiving the plurality of legs.

A method for assembling and adjusting a pressure setting of a valve, in accordance with an embodiment of the present invention, comprises positioning a threaded spider and a poppet spring on a poppet, mounting a valve body into an assembly fixture, inserting the poppet including the threaded spider and the poppet spring positioned thereon into the mounted valve body, pushing an adjusting fork through the assembly fixture and through the valve body, engaging the threaded spider with the adjusting fork, and flowing pressurized fluid into the assembly fixture while simultaneously rotating the adjusting fork in a direction to draw the threaded spider into the valve body and to compress the poppet spring.

The method may further comprise measuring a relief pressure of valve, and drawing the adjusting fork out of the valve body and out of engagement with the threaded spider when a desired valve relief pressure is obtained. Drawing the adjusting fork out of the valve body may include distorting threads in the valve body on both sides of at least one leg of the threaded spider.

The method may further comprise positioning a guide spider on the poppet prior to inserting the poppet into the mounted valve body, and flaring a leading end of the poppet to retain the threaded spider, spring, and guide spider on the poppet.

The method may further comprise engaging legs of the guide spider with slots in the adjusting fork. Engaging the threaded spider with the adjusting fork may include inserting legs of the threaded spider into respective slots in the adjusting fork.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
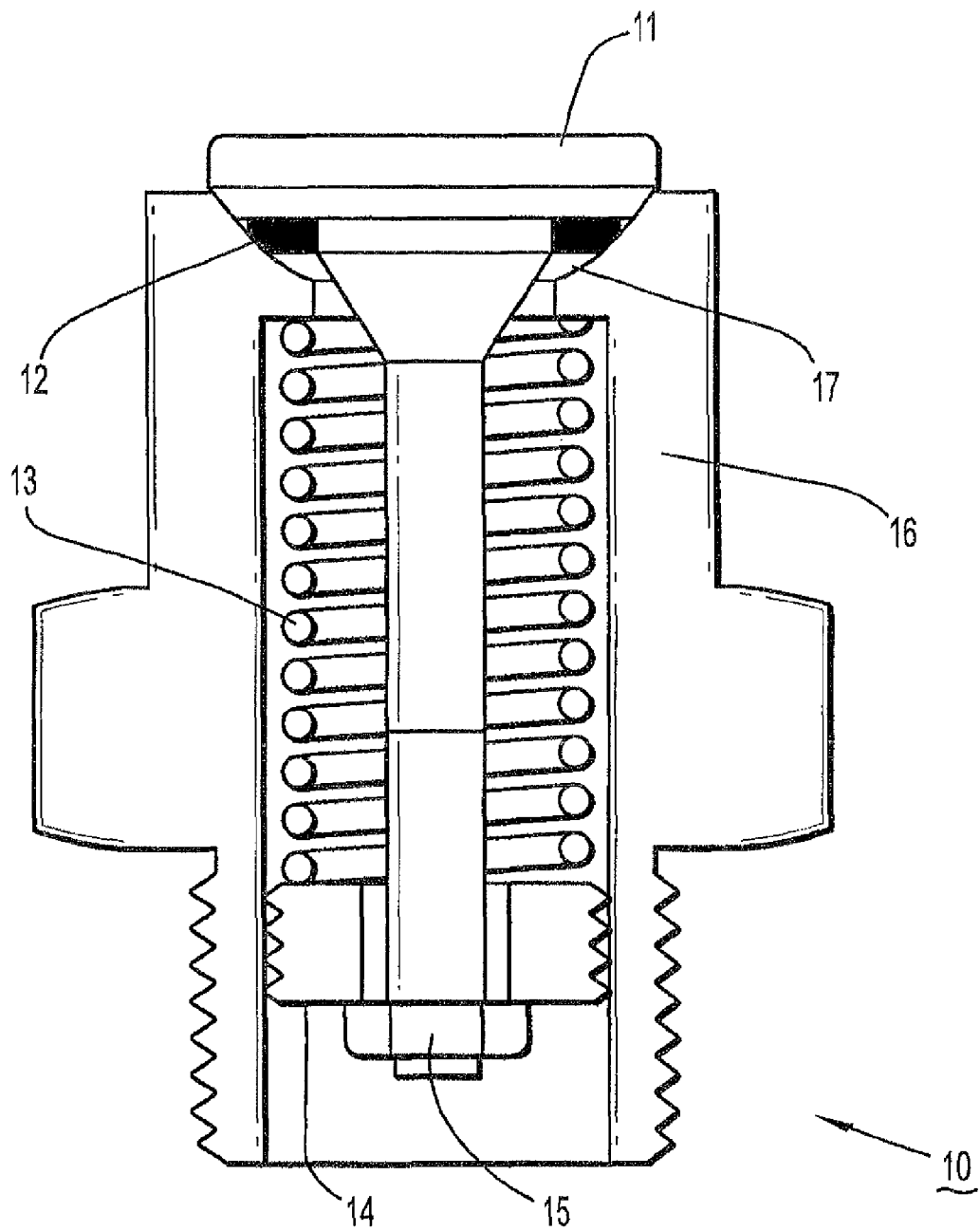
FIG. 1 is a sectional view of a conventional low pressure relief valve.
Figure 2:
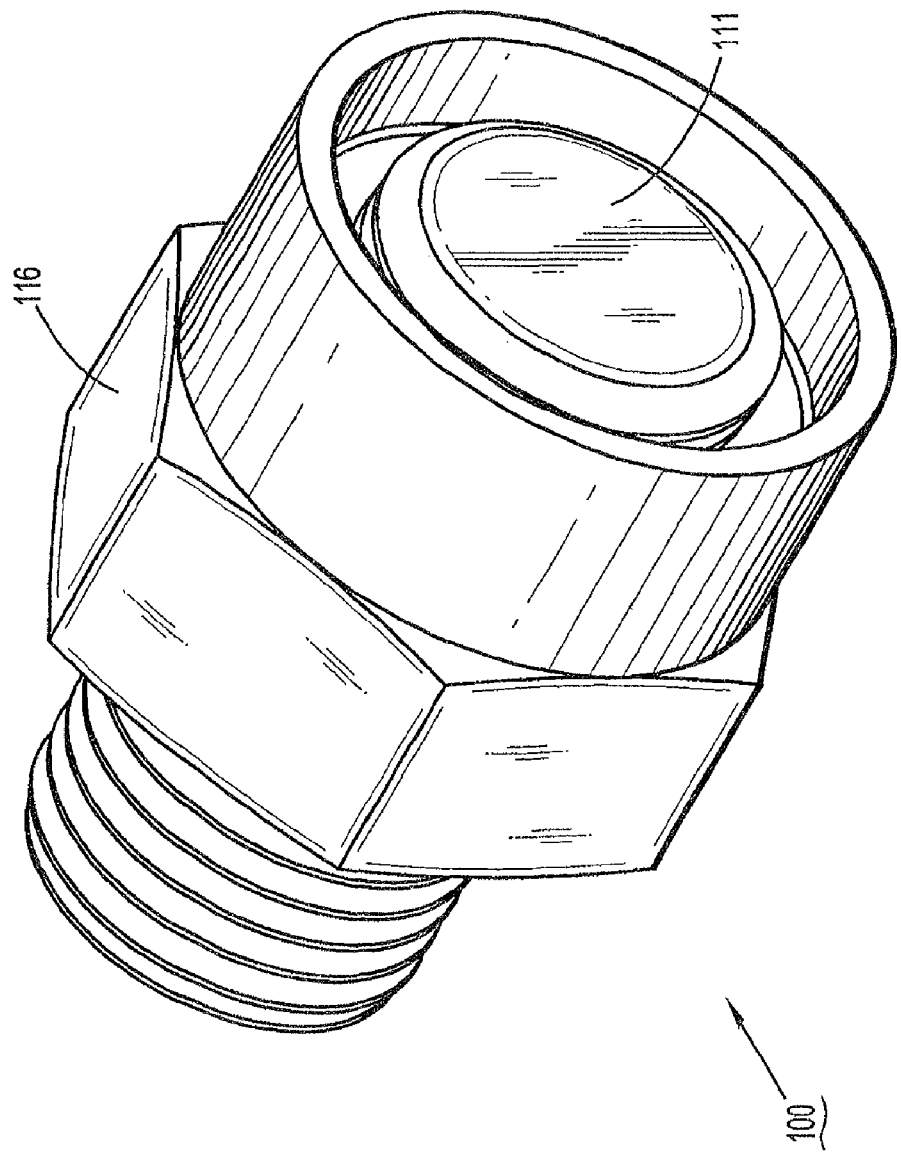
FIG. 2 is a perspective view of a low pressure relief valve, according to an embodiment of the present invention.
Figure 3:
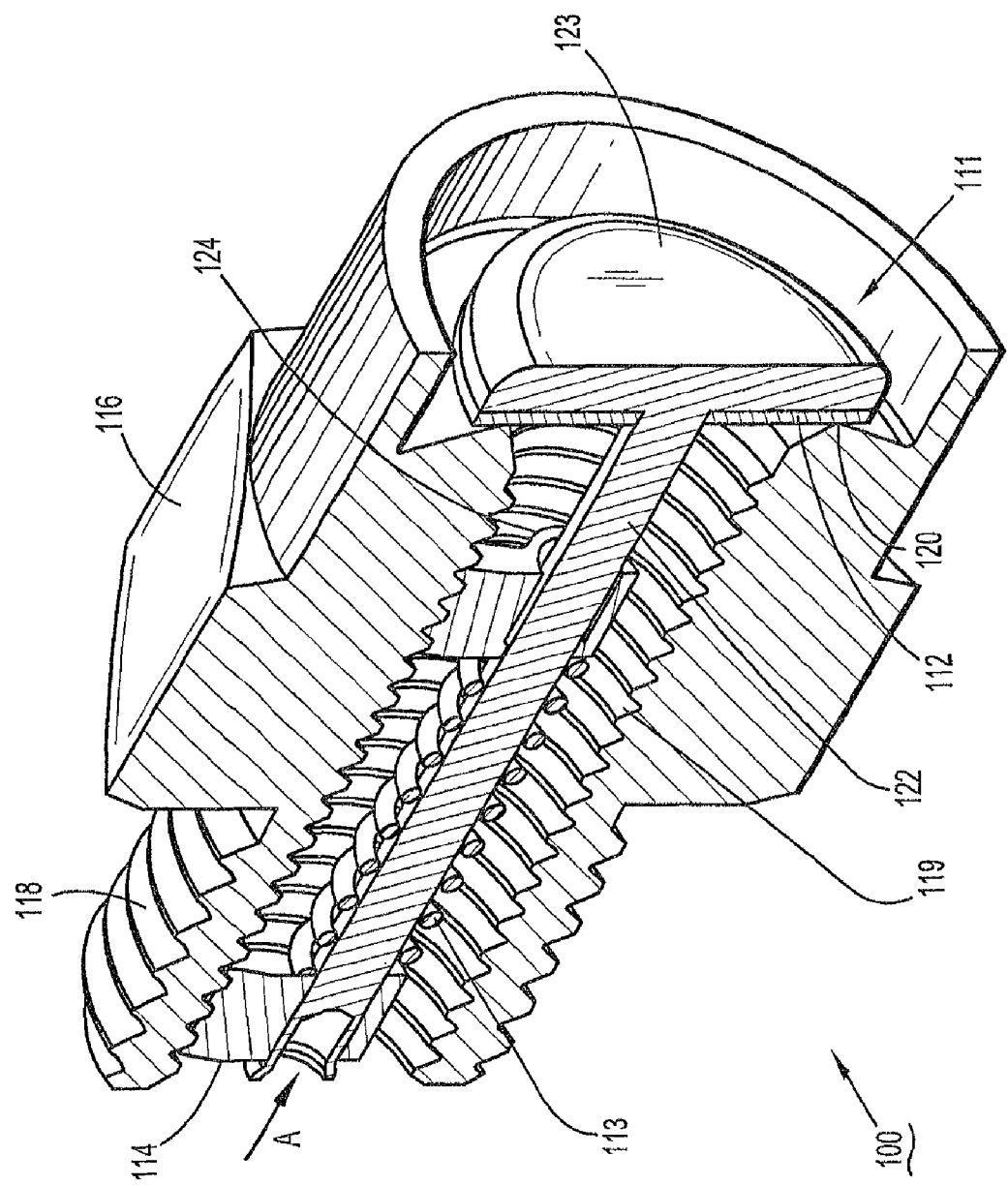
FIG. 3 is a perspective sectional view of a low pressure relief valve, according to an embodiment of the present invention.
Figure 4:
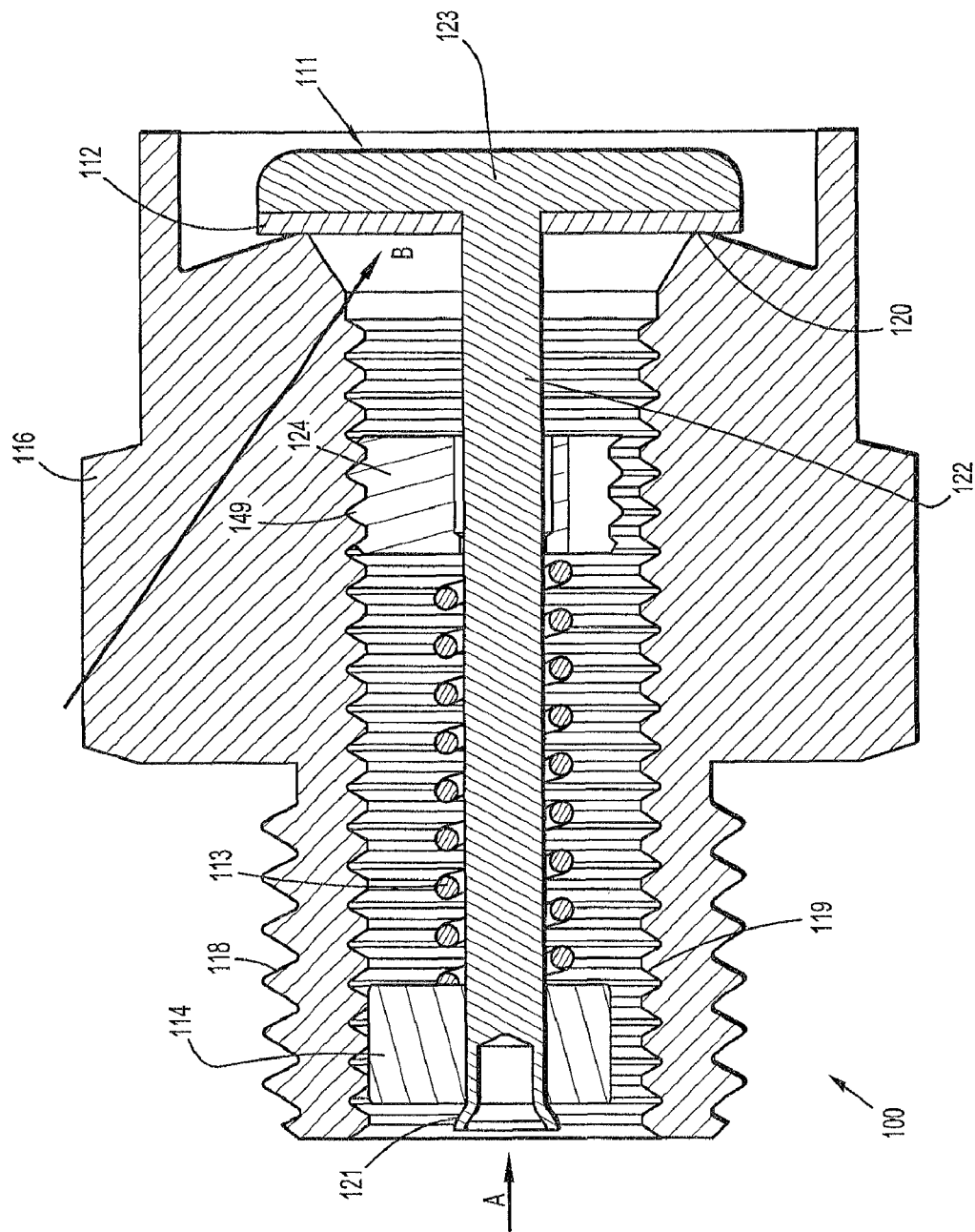
FIG. 4 is a side sectional view of a low pressure relief valve, according to an embodiment of the present invention.
Figure 5:
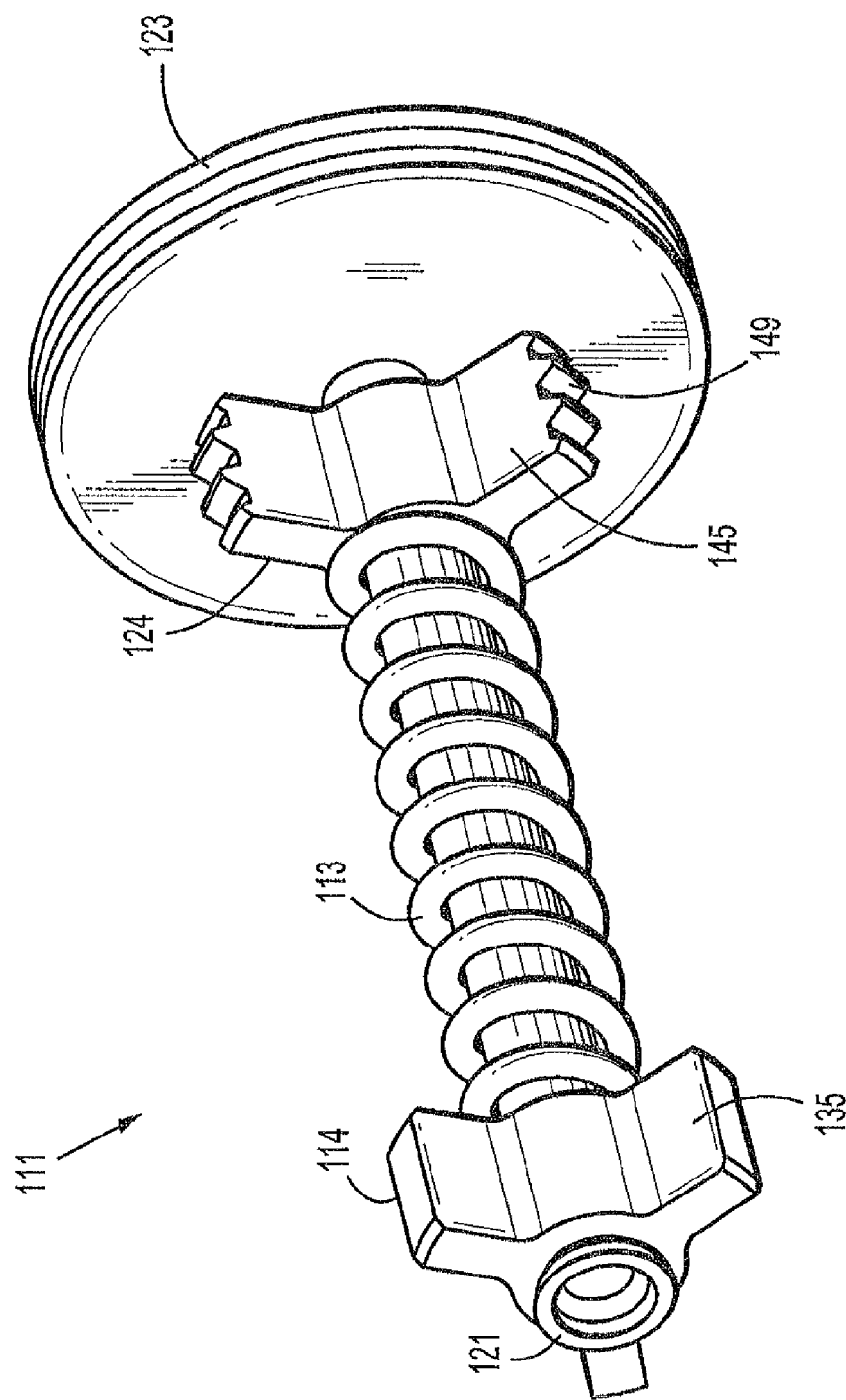
FIG. 5 is a perspective view of a poppet for a low pressure relief valve, according to an embodiment of the present invention.
Figure 6:
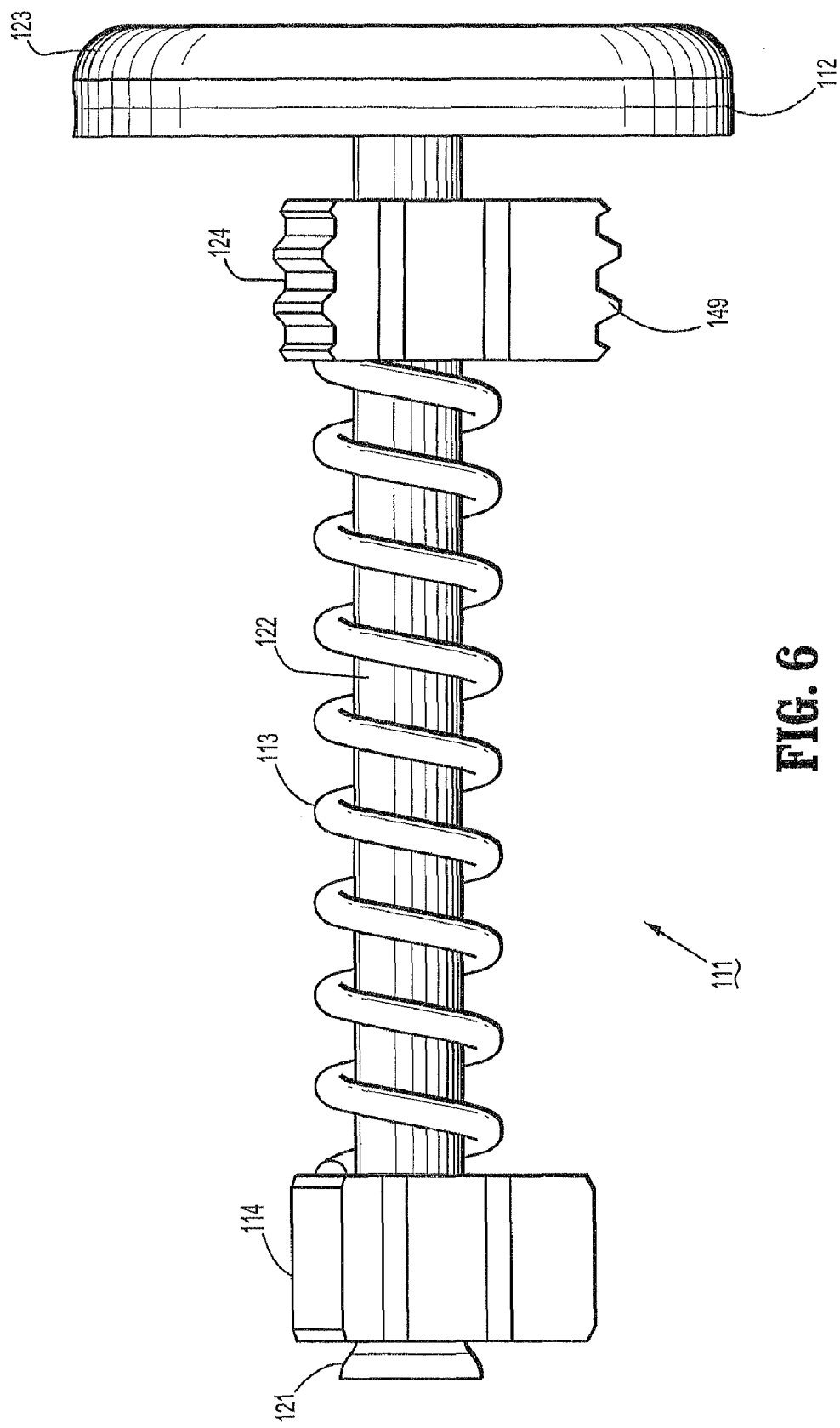
FIG. 6 is a side view of a poppet for a low pressure relief valve, according to an embodiment of the present invention.
Figure 7:
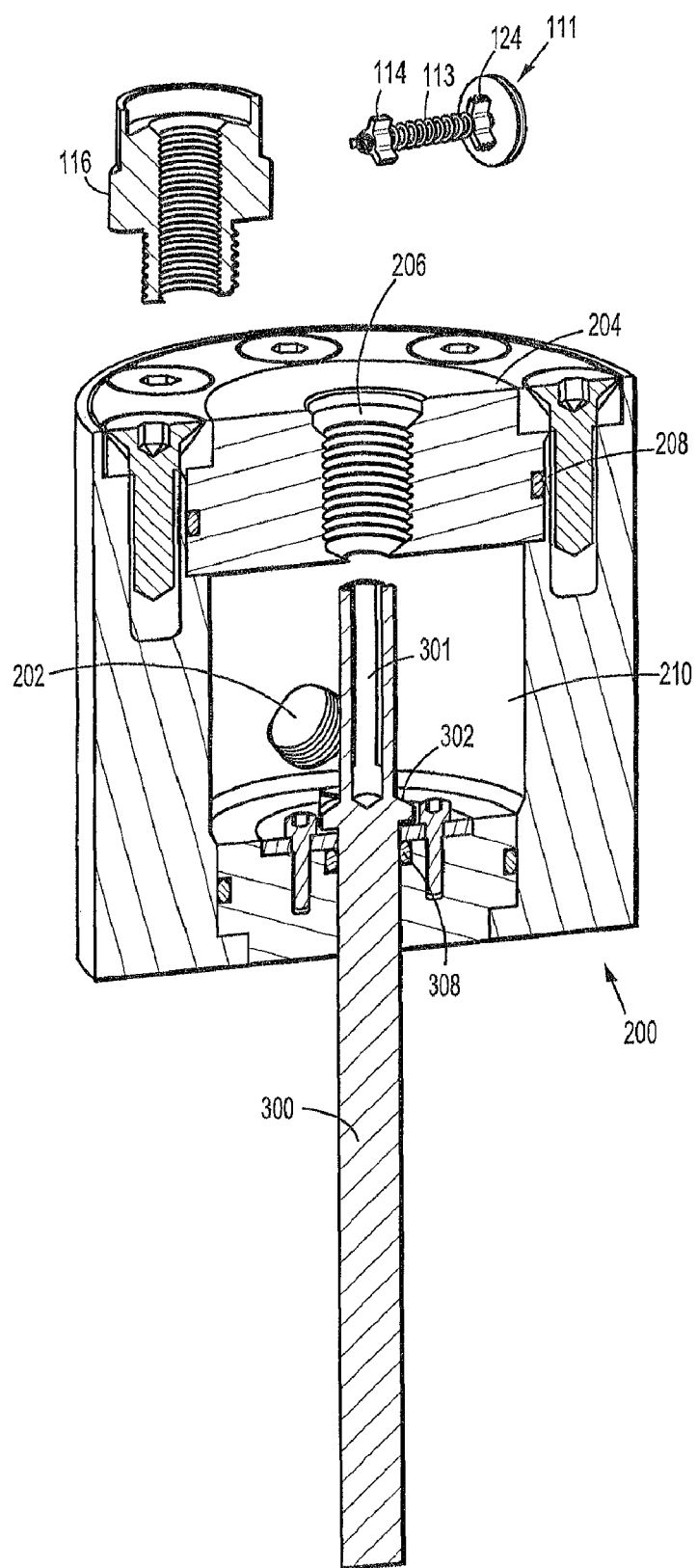
FIG. 7 is a perspective sectional view of an assembly and adjusting fixture prior to insertion of a valve body therein, according to an embodiment of the present invention.
Figure 8:
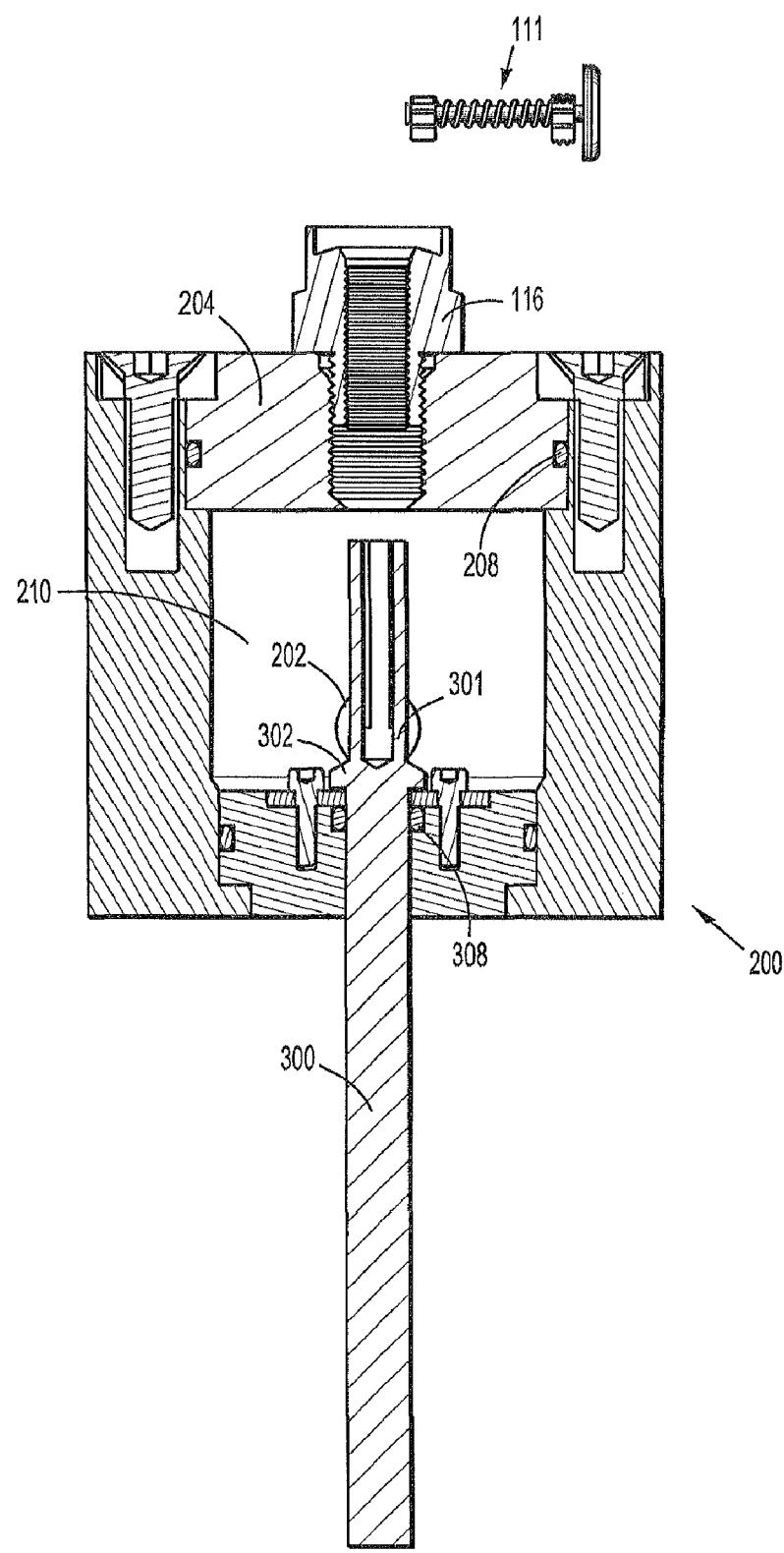
FIG. 8 is a side sectional view of an assembly and adjusting fixture including a valve body mounted thereto and prior to insertion of a poppet into the valve body, according to an embodiment of the present invention.
Figure 9:
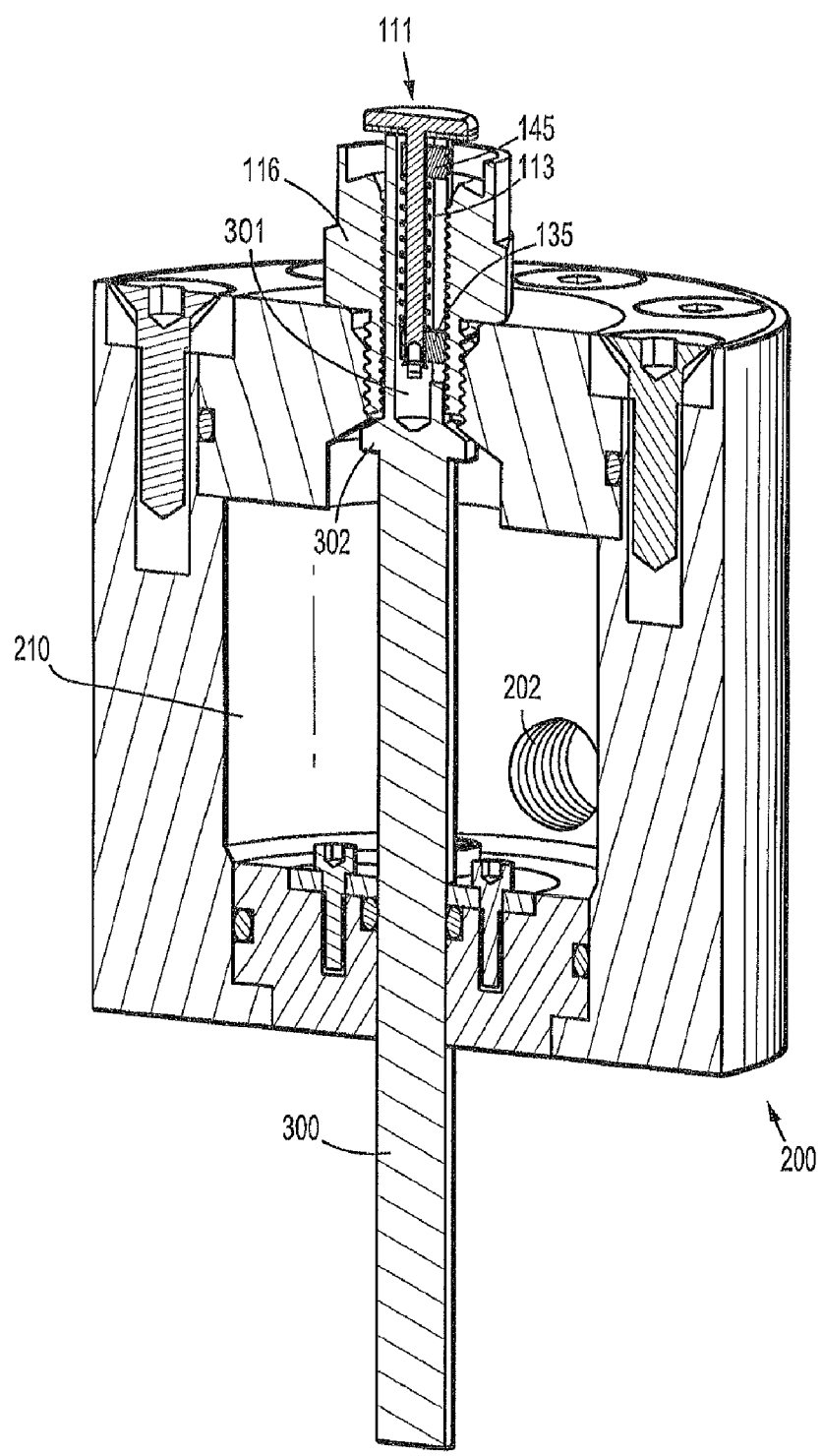
FIGS. 9-11 are perspective sectional views of an assembly and adjusting fixture including a valve mounted thereto for illustrating steps for adjusting the set pressure of the valve, according to an embodiment of the present invention.
Figure 10:
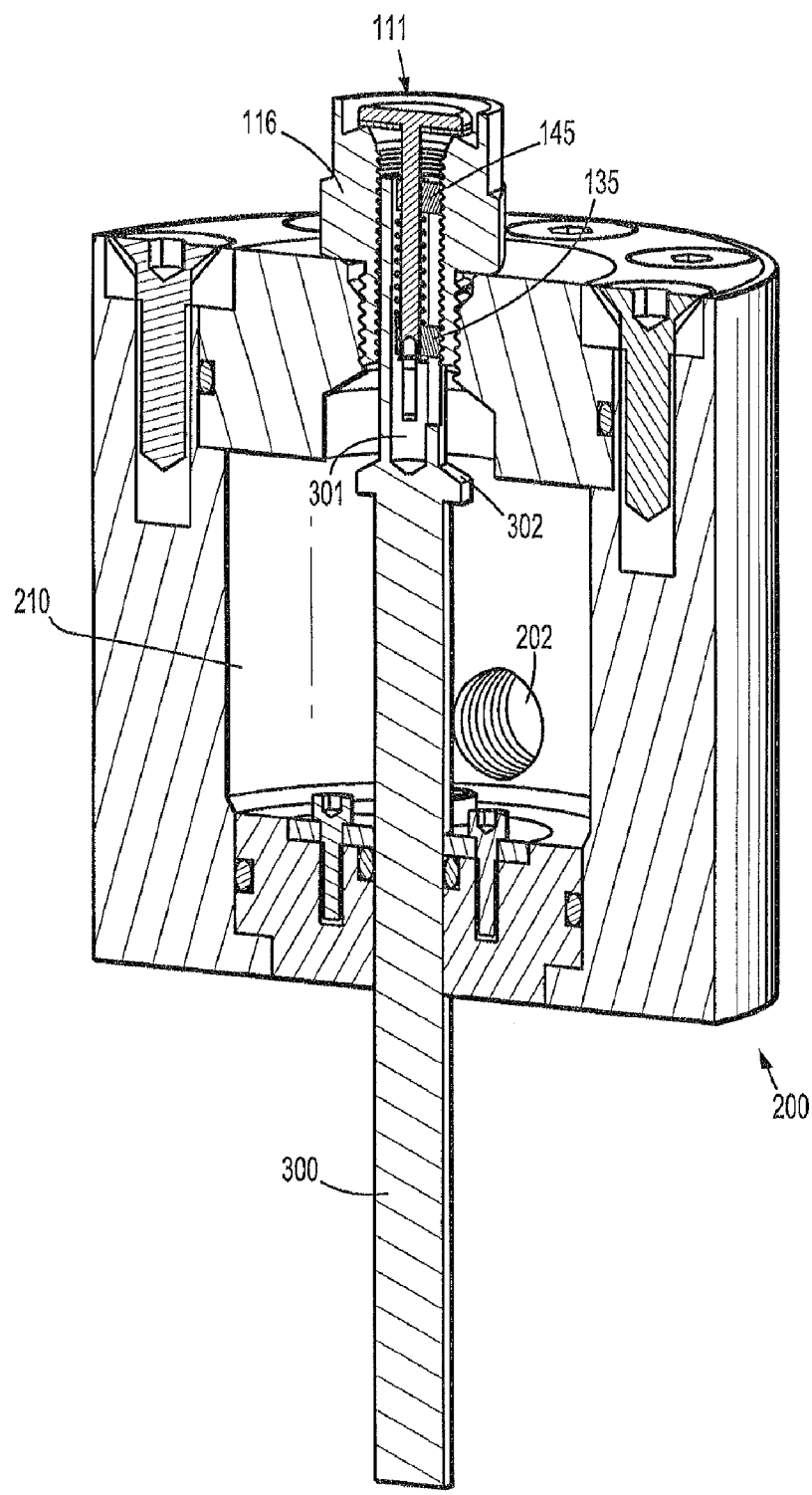
Figure 11:
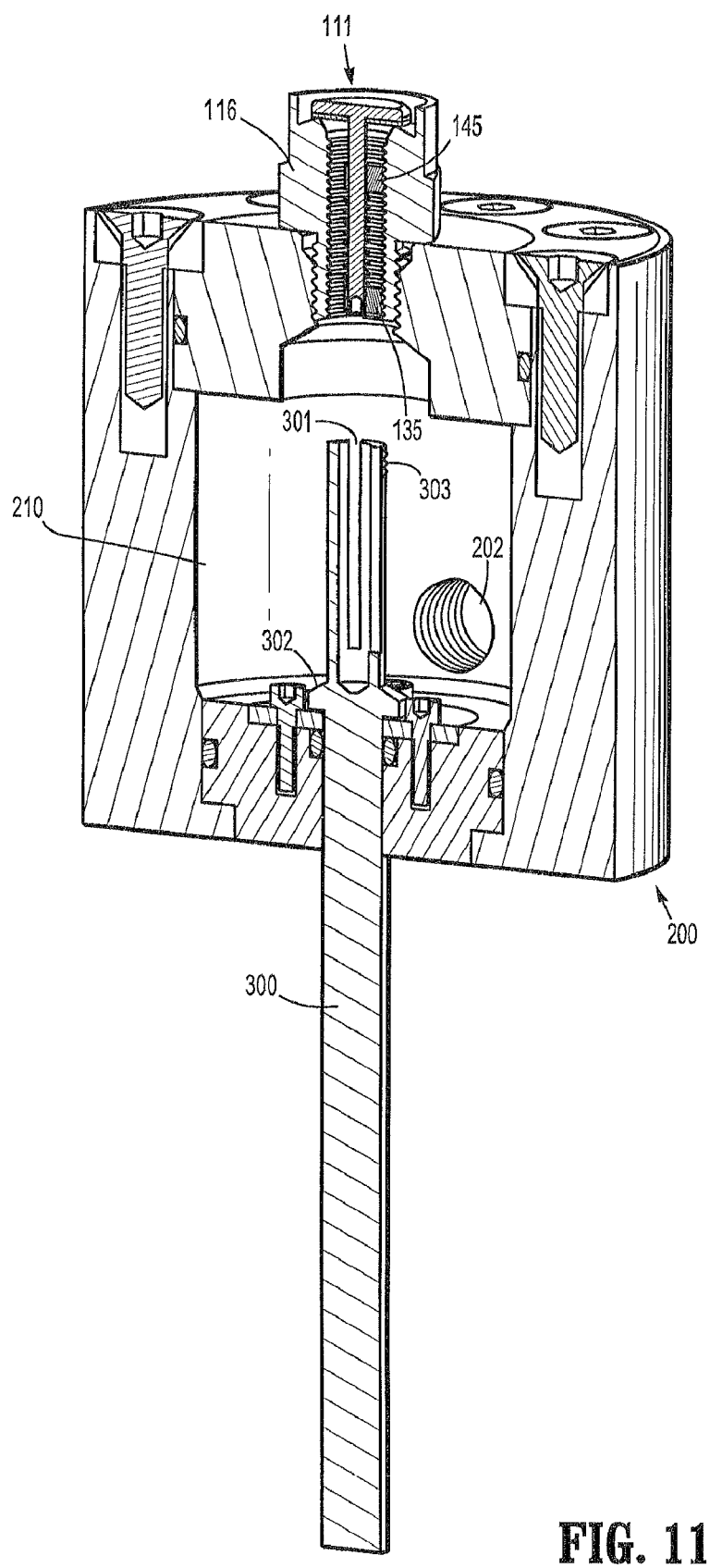
Figure 12:
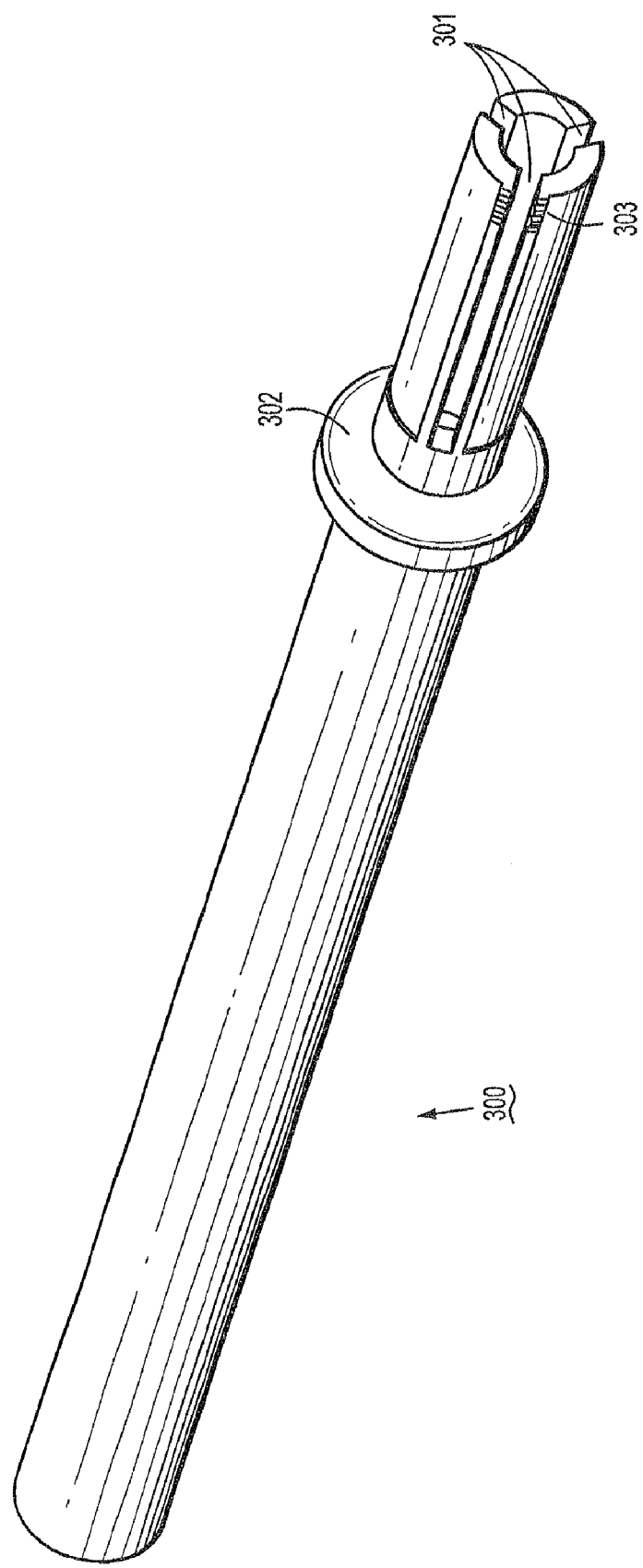
FIG. 12 is a perspective view of an adjusting fork, according to an embodiment of the present invention.
Figure 13:
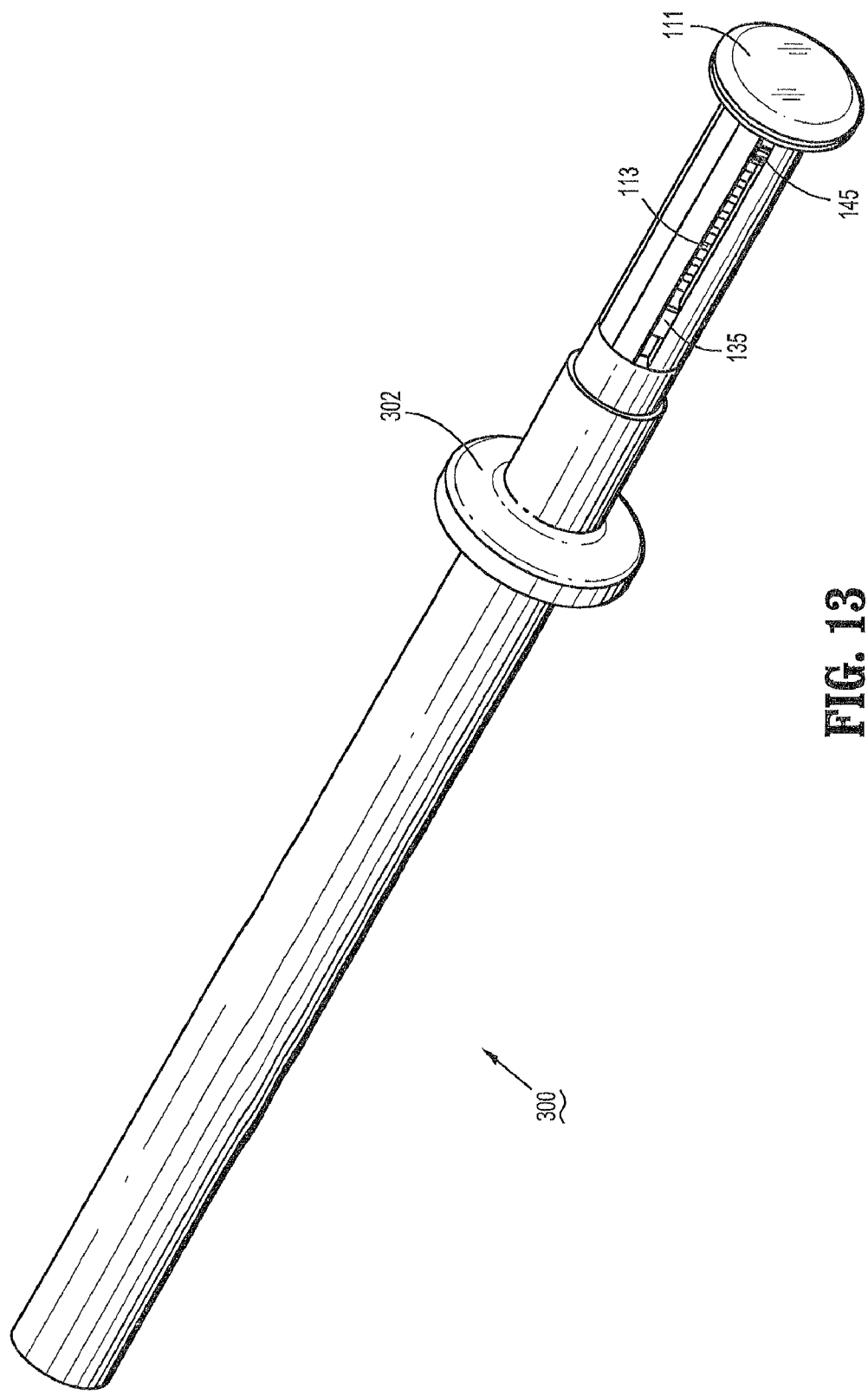
FIG. 13 is a perspective view of an adjusting fork connected to a poppet, according to an embodiment of the present invention.
Figure 14:
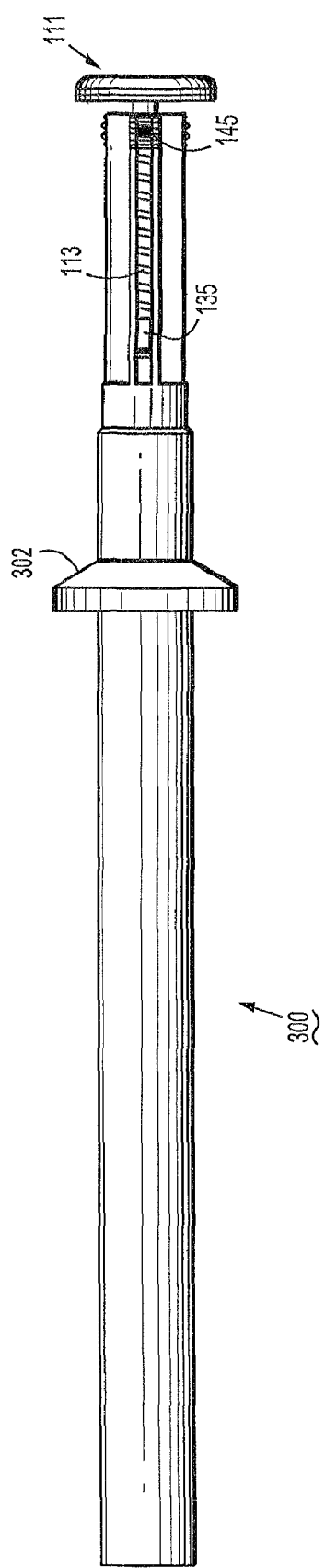
FIG. 14 is a side view of an adjusting fork connected to a poppet, according to an embodiment of the present invention.
Figure 15:
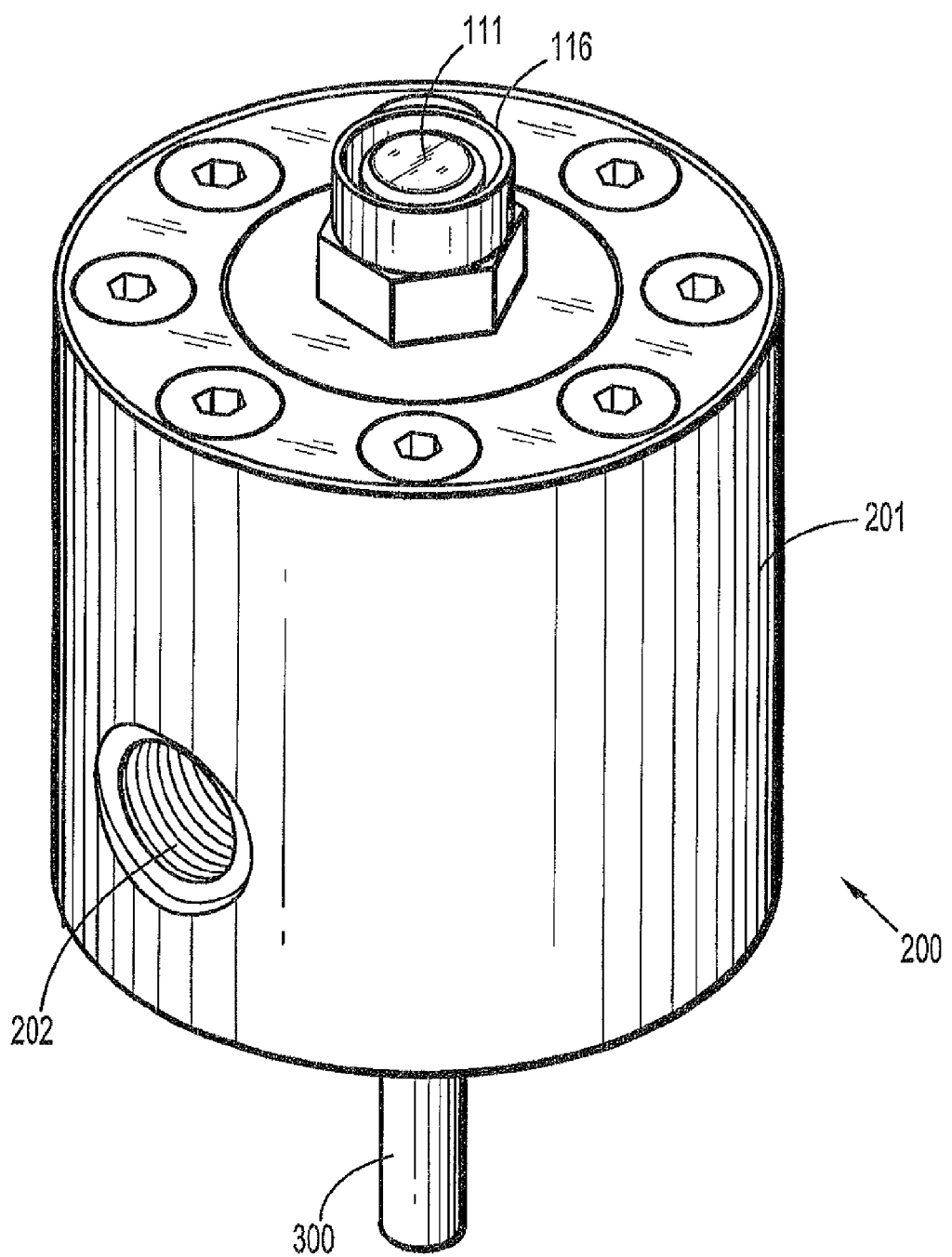
FIG. 15 is a perspective view of an assembly and adjusting fixture including a valve mounted thereto, according to an embodiment of the present invention.

Exemplary embodiments of the present invention now will be described more fully hereinafter with reference to the accompanying drawings. This invention may, however, be embodied in many different forms and should not be construed as limited to the embodiments set forth herein.

Referring to the Figures, a valve 100 employs a threaded upper spider 124 which allows assembly techniques that can eliminate all or most, for example, 90%, of the touch labor required to assemble and calibrate the valve 100. The components of valve 100, for example, the seal 112, the threaded spider 124, spring 113 and guide spider 114 are assembled on the poppet 111 out of the valve body 116. This sort of assembly may be performed by automated assembly, hand assembly, or a combination of automated and hand assembly. The seal 112 is placed first on the poppet shaft and rests directly against the poppet head 123. The threaded spider 124 is positioned on a poppet shaft 122 between the seal 112 and the poppet spring 113. The guide spider 114 is positioned last on the poppet shaft 122 between the poppet spring 113 and the leading end 121 of the poppet 111. An automatic center punch can be used to flare the end 121 of the poppet 111. The flared end 121 provides a holding fixture to retain the components on the poppet 111.

In operation, fluid enters the valve body 116 at A, and pressure through the valve 100 acts against the underside of poppet 111 and seal 112 at B. Pressure above set pressure compresses the spring 113, causing the fluid to escape and relieve pressure.

An assembly and adjusting fixture 200 is then used to quickly assemble and adjust the valve 100. An empty valve body 116 is screwed into an opening 206 at the top of the fixture 200. The assembly and adjusting fixture 200 includes a body adaptor 204 which fits and mounts into an upper portion of the test chamber 210. The body adaptor 204 includes the opening 206 into which the valve body 116 is screwed and the opening 206 includes mating threads to mate with mounting threads 118 located on the valve body 116. Adaptors 204 may include openings 206 of different sizes and shapes to accommodate different shapes and sizes of valve bodies. An O-ring seal 208 is positioned around the adaptor 204 so that fluid leakage and resulting pressure loss in the system is prevented.

An adjusting fork 300 extends up through the bottom of the test chamber 210 and reaches through the body 116. The pre-assembled poppet 111 is inserted into the valve body 116 and into the adjusting fork 300 through slots 301 in the adjusting fork 300. Protrusions (legs) 135 and 145 located on the guide and threaded spiders 114 and 124, respectively, are received by and engage the slots 301. According to an embodiment of the present invention, the guide and threaded spiders 114 and 124 each include three (3) equally spaced protrusions (legs) 135 and 145, which line up with three (3) slots 301. Alternatively, the number of protrusions (legs) 135 and 145 and corresponding slots 301 may be more or less than three (3). The adjusting fork 300 includes an increased diameter portion 302, which limits upward and downward movement of the adjusting fork 300 to a specified distance when the increased diameter portion 302 contacts an opening that is smaller than the increased diameter portion 302. In addition, like the O-ring seal 208, an O-ring seal 308 is positioned around the adjusting fork 300 so that fluid leakage and resulting pressure loss in the system is prevented.

The adjusting fork 300 is then rotated. As a result of the engagement of the legs 145 of the threaded spider 124 with the slots 301, upon rotation of the adjusting fork 300, the threaded spider 124 is rotated and drawn downward to engage the threads 149 of the threaded spider 124 with the threads 119 of the valve body 116. With each rotation of the adjusting fork 300, the threaded spider 124 can be drawn further downward into the body 116. Prior to rotation of the adjusting fork 300, the threads 149 of the threaded spider 124 are not yet engaged with the threads 119 of the valve body 116.

Fluid (e.g., liquid or gas) at the prescribed flow rate is introduced through opening 202 into the chamber 210 of the adjusting assembly 200. As the adjusting fork 300 is rotated, it draws the threaded spider 124 deeper into the body 116, further compressing the spring 113. As the compression of the spring 113 is increased, the pressure required to open the valve 100 increases. Since the fork 300 is not disturbing the reciprocating components (e.g., the poppet 111, seal 112, spring 113 and guiding spider 114), the valve's relief pressure can be set by rotating the adjusting fork 300, and the pressure can be continuously monitored without stopping fluid flow. Accordingly, the adjusting fork 300 can be rotated to adjust the set pressure while there is continuous fluid flow into the chamber 210 through opening 202. As a result, there is no need to start and stop fluid flow to adjust the set pressure during calibration of the valve. A pressure gauge (not shown) is attached to the adjusting assembly 200 to measure the relief pressure of the valve 100.

When the valve relief pressure is properly set, in order to lock the threaded spider 124 at the desired location within the valve body 116, the threaded spider 124 employs, for example, nylon locking buttons, such as, for example, NYLOK® nylon locking buttons, a thread upsetter on the adjusting fork, and/or liquid thread locking material, such as LOCTITE®, that is sprayed into the threads. Due to high pressure between the threads 149 of the threaded spider 124 and the threads 119 of the valve body 116, nylon locking buttons formed, for example, on the threads 149, deform and spread out to become wedged between the threads 149 of the threaded spider 124 and the threads 119 of the valve body 116. Also, when the adjusting fork 300 is withdrawn from the valve body 116, a thread upsetter 303 can be used to distort the threads 119 on the valve body 116 on both sides of a leg of the spider 124 so that the threaded spider 124 is unable to be loosened from its position in the valve body 116. At this point, fluid supply can be shut off, and the valve 100 removed from the assembly 200. Then, another body 116 can be installed in the assembly 200 to set the relief pressure of and assemble another valve 100. The valves can be quickly adjusted as the adjusting fork 300 is introduced into a valve body, rotated during fluid flow, and subsequently withdrawn and removed from the valve 100.

The valve 100 employs a seal 112 made of, for example, filled polytetrafluoroethylene (PTFE) which, even after years of not being opened, does not attach itself to the seat 120. Accordingly, first crack, even after many years, remains within tolerance. Furthermore, since both the threaded 124 and the guide spiders 114 insure proper guidance of the poppet 111, flow is accurate and even seal wear is maintained.

Figure 16A:
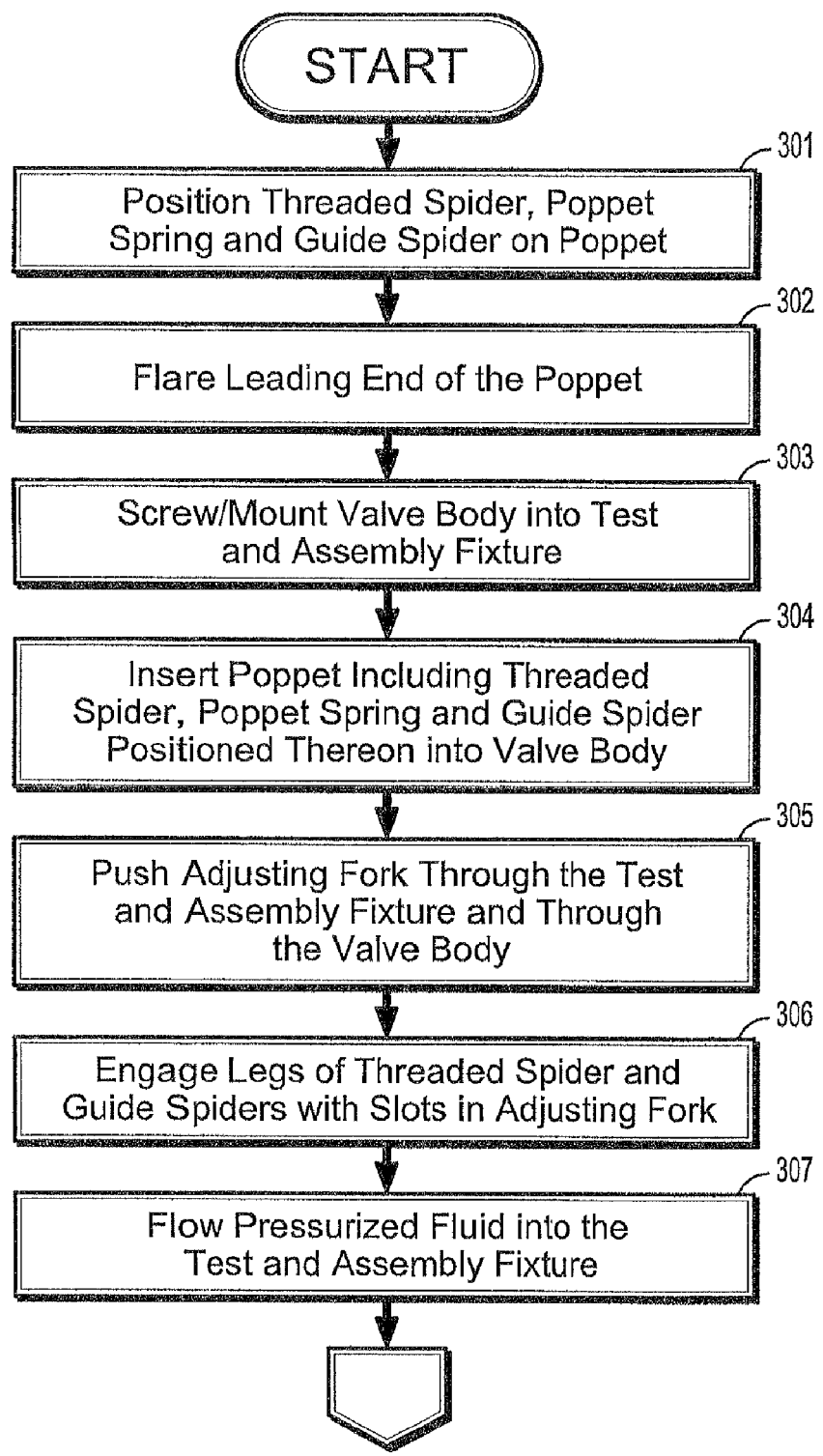
FIGS. 16A-16B show a flow chart illustrating steps for assembling and adjusting the set pressure of a low pressure relief valve, according to an embodiment of the present invention.
Figure 16B:
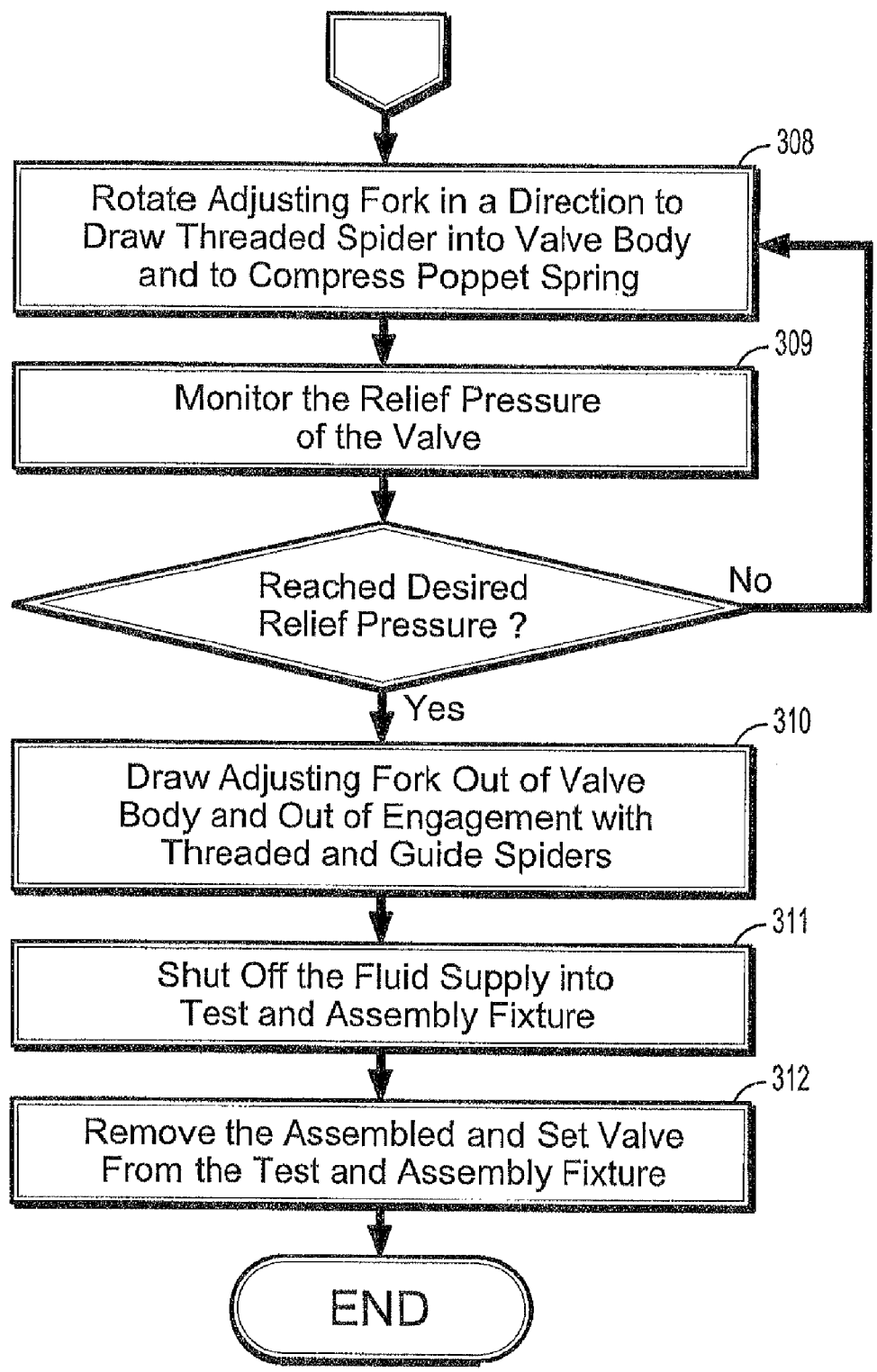

Referring to the flow-chart in FIGS. 16A-16B, a method for assembling and adjusting a set pressure of a valve includes positioning a threaded spider, a poppet spring and a guide spider on a poppet (Step 301), flaring a leading end of the poppet (Step 302), mounting (e.g., by screwing) a valve body into a test and assembly fixture (Step 303), inserting the poppet including the threaded spider, poppet spring and guide spider positioned thereon into the valve body (Step 304), pushing an adjusting fork through the test and assembly fixture and through the valve body (Step 305), engaging legs of the threaded and guide spiders with slots in the adjusting fork (Step 306), flowing pressurized fluid into the test and assembly fixture (Step 307), rotating the adjusting fork in a direction to draw the threaded spider into the valve body and to compress the poppet spring (Step 308), monitoring the relief pressure of valve (Step 309), when the desired valve relief pressure is obtained, drawing the adjusting fork out of the valve body and out of engagement with the threaded and guide spiders (Step 310), shutting off the fluid supply into test and assembly fixture (Step 311), and removing the assembled and set valve from the test and assembly fixture (Step 312). The step of drawing the adjusting fork out of the valve body may include distorting the threads in the valve body on both sides of a leg (or of each leg) of the threaded spider so that the threaded spider cannot be screwed out of its set position. The distortion can be accomplished by a thread upsetter suitably positioned on the adjusting fork to distort the threads of the valve body. The step of flaring the leading end of the poppet may be performed by a center-punch, for example, an automatic center-punch that engages the leading end of the poppet shaft.

Although exemplary embodiments of the present invention have been described hereinabove, it should be understood that the present invention is not limited to these embodiments, but may be modified by those skilled in the art without departing from the spirit and scope of the present invention, as defined in the appended claims.

What is claimed is:

1. A device for assembling and setting a cracking pressure of a valve, the device comprising:
    a chamber;
    an opening for receiving and mounting a valve body in the chamber, wherein the valve body receives a poppet comprising a shaft, a poppet spring positioned on the shaft, and a threaded spider positioned on the shaft between the poppet spring and a head of the poppet;
    an adjusting fork positioned in the chamber, and moveable through the valve body to engage the threaded spider, and draw the threaded spider into the valve body by rotating the adjusting fork, wherein the adjusting fork extends into the chamber through a second opening in the device, and a seal is positioned around an outer diameter of the adjusting fork adjacent the second opening.

2. The device as recited in claim 1, wherein the threaded spider compresses the poppet spring.

3. The device as recited in claim 1, wherein the chamber comprises an opening for receiving pressurized fluid into the chamber and the adjusting fork is rotated while the pressurized fluid flows into the chamber.

4. The device as recited in claim 1, wherein the threaded spider includes a plurality of legs protruding from the threaded spider, and the adjusting fork includes a plurality of slots for respectively receiving the plurality of legs.

5. The device as recited in claim 1, wherein the valve body includes threads positioned on an inner surface of the valve body, and the threaded spider includes threads positioned on an outer surface of the threaded spider that engage the threads of the valve body.

6. The device as recited in claim 1, wherein the poppet further comprises a guide spider positioned on the shaft between the poppet spring and a leading end of the poppet, the guide spider includes a plurality of legs protruding from the guide spider, and the adjusting fork includes a plurality of slots for respectively receiving the plurality of legs.

7. The device as recited in claim 1, wherein the adjusting fork includes an increased diameter portion having a diameter larger than a diameter of the second opening.

8. A method for assembling and adjusting a pressure setting of a valve, the method comprising:
   positioning a threaded spider and a poppet spring on a poppet;
   mounting a valve body into an assembly fixture;
   inserting the poppet including the threaded spider and the poppet spring positioned thereon into the mounted valve body;
   pushing an adjusting fork through an opening in the assembly fixture and through the valve body, wherein a seal is positioned around an outer diameter of the adjusting fork adjacent the opening;
   engaging the threaded spider with the adjusting fork; and
   flowing pressurized fluid into the assembly fixture while simultaneously rotating the adjusting fork in a direction to draw the threaded spider into the valve body and to compress the poppet spring.

9. The method according to claim 8, further comprising:
   measuring a relief pressure of a valve; and
   drawing the adjusting fork out of the valve body and out of engagement with the threaded spider when a desired valve relief pressure is obtained.

10. The method according to claim 8, further comprising positioning a guide spider on the poppet prior to inserting the poppet into the mounted valve body.

11. The method according to claim 10, further comprising engaging legs of the guide spider with slots in the adjusting fork.

12. The method according to claim 8, wherein engaging the threaded spider with the adjusting fork includes inserting legs of the threaded spider into respective slots in the adjusting fork.

13. The method according to claim 8, further comprising flaring a leading end of the poppet.

14. The method according to claim 8, wherein the adjusting fork includes an increased diameter portion having a diameter larger than a diameter of the opening.

* * * * *